US012065794B2

(12) United States Patent
Oikawa et al.

(10) Patent No.: US 12,065,794 B2
(45) Date of Patent: Aug. 20, 2024

(54) ROAD STUD SYSTEM, METHOD FOR CONTROLLING ROAD STUD, AND CONTROL PROGRAM OF ROAD STUD

(71) Applicant: TOYOTA JIDOSHA KABUSHIKI KAISHA, Toyota (JP)

(72) Inventors: Susumu Oikawa, Yokohama (JP); Hiroyuki Nakatani, Gotenba (JP); Kenichi Kitahama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/988,838

(22) Filed: Nov. 17, 2022

(65) Prior Publication Data

US 2023/0167615 A1 Jun. 1, 2023

(30) Foreign Application Priority Data

Nov. 26, 2021 (JP) ................................ 2021-191684

(51) Int. Cl.

| | |
|---|---|
| ***E01F 9/559*** | (2016.01) |
| ***E01F 9/30*** | (2016.01) |
| ***G08G 1/16*** | (2006.01) |

(52) U.S. Cl.

CPC ................ *E01F 9/559* (2016.02); *E01F 9/30* (2016.02); *G08G 1/166* (2013.01)

(58) Field of Classification Search

CPC .. E01F 9/559; E01F 9/30; E01F 11/00; G08G 1/166; G08G 1/02; G08G 1/005; G08G 1/095

See application file for complete search history.

(56) References Cited

U.S. PATENT DOCUMENTS

| | | | | |
|---|---|---|---|---|
| 10,917,473 | B2 * | 2/2021 | Bass | G08G 1/0116 |
| 2017/0289821 | A1 * | 10/2017 | Berry | G01S 1/68 |
| 2020/0258384 | A1 | 8/2020 | Suh | |

FOREIGN PATENT DOCUMENTS

| | | | |
|---|---|---|---|
| JP | 2000-345522 | A | 12/2000 |
| JP | 2013096200 | A | 5/2013 |
| JP | 2021526605 | A | 10/2021 |

* cited by examiner

*Primary Examiner* — Omeed Alizada

(74) *Attorney, Agent, or Firm* — Dinsmore & Shohl LLP

(57) ABSTRACT

In a road stud system, a road stud includes a terminal storage unit, a light emission unit, and a radio communication unit. The light emission unit emits a light having a first color tone or a second color tone in a first or second direction. The radio communication unit receives an instruction signal for an operation of the light emission unit. A control system that controls a plurality of road studs includes a determination unit and an instruction unit. The determination unit determines whether an overlapping area is in a first state in which passage of a pedestrian is prioritized or a second state in which passage of an automobile is prioritized. The instruction unit sends an instruction signal, in accordance with the result of the determination, regarding the direction of the light emission and the color tone to each of the road studs.

8 Claims, 12 Drawing Sheets

230 150

330

| FIXED POSITION INFORMATION | STATE OF FIRST LIGHT EMISSION UNIT | STATE OF SECOND LIGHT EMISSION UNIT | STATE OF DETECTION SIGNAL | GROUP ATTRIBUTE INFORMATION |
|---|---|---|---|---|
| E137. 16021, N35. 05075 | 0:1:0 | 1:0:0 | LO | 20A |
| E137. 16022, N35. 05074 | 0:1:0 | 1:0:0 | HI | 20A |
| E137. 16023, N35. 05073 | 0:0:0 | 0:0:0 | HI | 20A |
| E137. 15457, N35. 05465 | 0:0:1 | 0:0:0 | LO | 20B |
| E137. 15456, N35. 05465 | 0:0:1 | 0:0:0 | LO | 20B |
| . . . | . . . | . . . | . . . | . . . |

Fig. 8

ROAD STUD SYSTEM, METHOD FOR CONTROLLING ROAD STUD, AND CONTROL PROGRAM OF ROAD STUD

CROSS REFERENCE TO RELATED APPLICATIONS

This application is based upon and claims the benefit of priority from Japanese patent application No. 2021-191684, filed on Nov. 26, 2021, the disclosure of which is incorporated herein in its entirety by reference.

BACKGROUND

The present disclosure relates to a road stud system, a method for controlling a road stud, and a control program of a road stud.

Various efforts have been made to make roads more convenient. For example, a road stud that includes solar cells and a light emission unit and causes the light emission unit to emit a light by using sunlight has been proposed (Japanese Unexamined Patent Application Publication No. 2000-345522).

SUMMARY

However, while the light emission unit emits a light while the solar cells are receiving sunlight in the aforementioned technique, the amount of power obtained from the solar cells is limited. On the other hand, it has been desired that a more effective road stud system be developed.

The present disclosure has been made in order to solve the aforementioned problem and provides a road stud system having suitable visibility.

A road stud system according to the present disclosure includes a control system for controlling a plurality of road studs embedded in or on outer edges of an overlapping area where a sidewalk and a roadway overlap each other and the plurality of road studs controlled by the control system. Each of the above road studs includes a terminal storage unit, a light emission unit, and a radio communication unit. The terminal storage unit stores preset identification information. The light emission unit emits a light having a first color tone or a second color tone that is different from the first color tone in a preset first direction or a second direction that is different from the first direction. The radio communication unit receives an instruction signal for an operation of the light emission unit from the preset control system based on the identification information. The above control system includes a determination unit and an instruction unit. The determination unit determines whether the overlapping area is in a first state in which passage of a pedestrian is prioritized or a second state in which passage of an automobile is prioritized. The instruction unit sends an instruction signal, in accordance with the result of the determination, regarding the direction of the light emission and the color tone to each of the road studs.

With the above-described configuration, the road stud system is able to suitably emit light to pedestrians and automobiles.

In the above road stud system, when the result of the determination shows that the overlapping area is in the first state, the instruction unit may instruct that a light having the first color tone be emitted in the first direction and instruct that a light having the second color tone be emitted in the second direction. In this case, when the result of the determination shows that the overlapping area is in the second state, the instruction unit may instruct that a light having the second color tone be emitted in the first direction and instruct that a light having the first color tone be emitted in the second direction. Accordingly, the road stud system is able to clearly show whether the overlapping area is in the first state or the second state to the surroundings.

In the above road stud system, the road stud may further include a moving body detection unit configured to generate a detection signal indicating that a nearby moving body has been detected and the radio communication unit may transmit the detection signal to the control system. In this case, the determination unit further determines whether or not it is possible that a moving body may enter the overlapping area based on the detection signal. When the result of the determination shows that the overlapping area is in the first state, the instruction unit instructs that a light having the second color tone be emitted in the first direction in a case in which it is possible that an automobile may enter the overlapping area. Accordingly, the road stud system is able to let the nearby people, objects, etc. visually recognize that it is possible that an automobile may enter the overlapping area.

In the above road stud system, the determination unit may set the result of the determination as the first state when a pedestrian is detected in a sidewalk which is in or near the overlapping area or when an automobile is not detected in a roadway which is in or near the overlapping area. In this case, the determination unit may set the result of the determination as the second state when the result of the determination shows that the overlapping area is not in the first state. Accordingly, the road stud system is able to reduce the possibility that a pedestrian and an automobile may contact each other in the overlapping area.

In the above road stud system, the control system may include a group control apparatus and an overall control apparatus. The group control apparatus includes a group control unit that is connected to each of the plurality of road studs in such a way that the group control apparatus and each of the plurality of road studs can perform radio communication, the group control unit controlling the plurality of road studs based on the identification information. The overall control apparatus is connected to a plurality of the group control apparatuses in such a way that the overall control apparatus and the plurality of the group control apparatuses can communicate with each other and controls the plurality of road studs based on the identification information via the group control apparatus. Accordingly, the road stud system is able to collectively control a wide range of road studs.

In the above road stud system, the storage unit may store unique fixed position information as the identification information. Accordingly, the road stud system is able to perform control in association with the position information.

In the above road stud system, a control system may instruct the road studs embedded in positions along the outer edges of the overlapping area in the first state or the second state to perform a light emission operation based on the fixed position information. Accordingly, the road stud system is able to easily control a plurality of road studs.

In a method for controlling a road stud according to the present application, a control system for controlling a plurality of road studs embedded in or on outer edges of an overlapping area where a sidewalk and a roadway overlap each other and a plurality of road studs controlled by a control system execute the following method. Each of the road studs stores preset identification information in a terminal storage step. Each of the road studs emits a light having a first color tone or a second color tone which is different from the first color tone in a preset first direction or a second direction that is different from the first direction in a light emission step. Each of the road studs receives, based on the identification information, an instruction signal for an operation of the light emission step from the preset control system in a radio communication step. The control system determines whether the overlapping area is in a first state in which passage of a pedestrian is prioritized or a second state in which passage of an automobile is prioritized in a determination step. The control system sends an instruction signal, in accordance with the result of the determination, regarding the direction of the light emission and the color tone to each of the road studs in an instruction step.

According to the aforementioned method, the road stud system is able to suitably emit light to pedestrians and automobiles.

A control program of a road stud according to the present disclosure causes a control system for controlling a plurality of road studs embedded in or on outer edges of an overlapping area where a sidewalk and a roadway overlap each other and the plurality of road studs controlled by the control system to execute the following processing. Each of the road studs stores preset identification information in a terminal storage step. Each of the road studs emits a light having a first color tone or a second color tone which is different from the first color tone in a preset first direction or a second direction that is different from the first direction in a light emission step. Each of the road studs receives, based on the identification information, an instruction signal for an operation of the light emission step from the preset control system in a radio communication step. The control system determines whether the overlapping area is in a first state in which passage of a pedestrian is prioritized or a second state in which passage of an automobile is prioritized in a determination step. The control system sends an instruction signal, in accordance with the result of the determination, regarding the direction of the light emission and the color tone to each of the road studs in an instruction step.

According to the above program, a road stud system is able to suitably emit light to pedestrians and automobiles.

According to the present disclosure, it is possible to provide a road stud system having suitable visibility.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 8 is a diagram showing group information stored in the overall control apparatus;

DESCRIPTION OF EMBODIMENTS

Hereinafter, the present disclosure will be described based on an embodiment of the present disclosure. However, the disclosure set forth in claims is not limited to the following embodiment. Moreover, it is not absolutely necessary to provide all the configurations to be described in the following embodiment as means for solving the problems. For the sake of clarification of the description, the following description and the drawings are partially omitted and simplified as appropriate. Throughout the drawings, the same symbols are attached to the same elements and overlapping descriptions are omitted as necessary.

Embodiment

Figure 1:
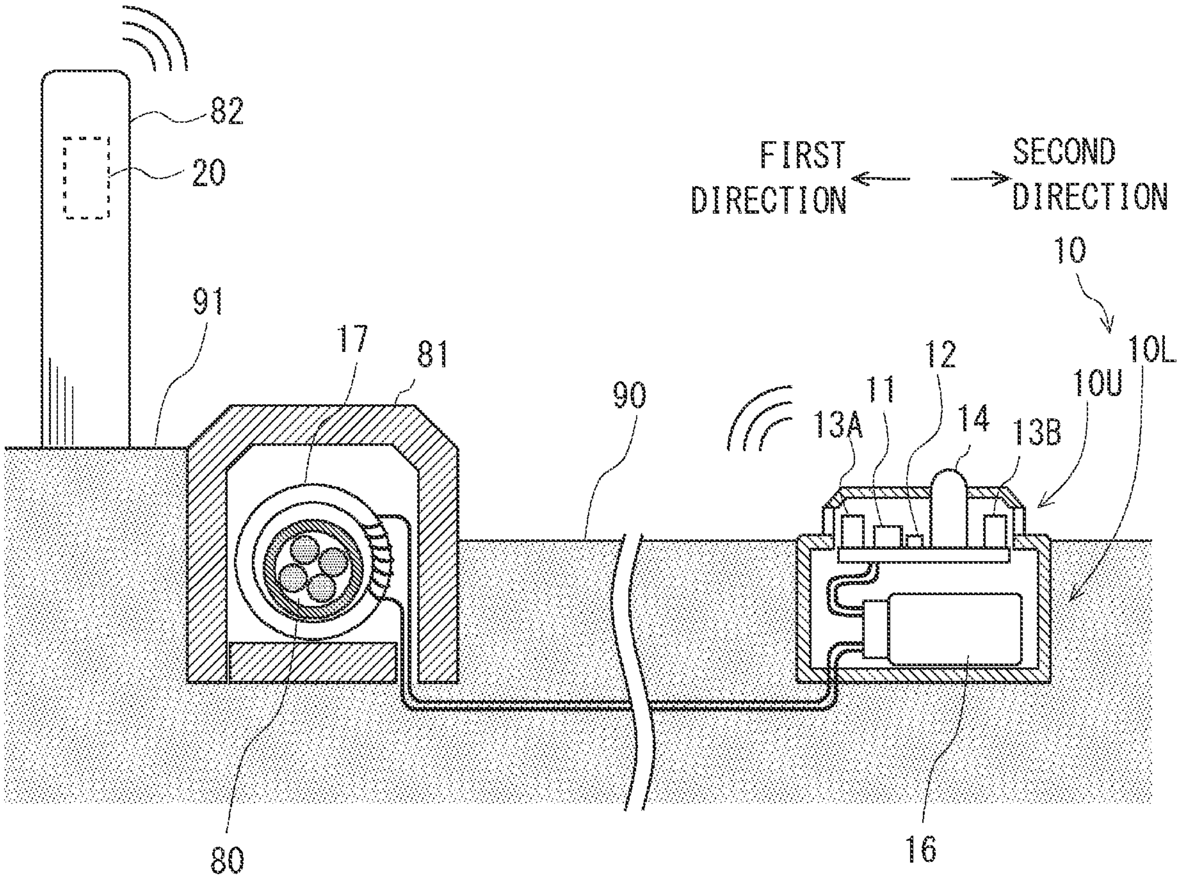
FIG. 1 a cross-sectional view showing a configuration of a road stud according to an embodiment.

Hereinafter, an embodiment will be described. FIG. 1 is a cross-sectional view showing a configuration of a road stud according to the embodiment. FIG. 1 shows a cross section in a plane that is perpendicular to a direction in which a road 90 and a sidewalk 91 are extended. Further, FIG. 1 schematically shows the cross section of a road stud 10 embedded in the road 90. FIG. 1 further includes a piping box 81 embedded between the road 90 and the sidewalk 91 and a multi-purpose pole 82 installed on the sidewalk 91.

The road stud 10 includes a main block 10U that is exposed on the road 90 and a power supply block 10L embedded in the road 90. The road stud 10 is embedded in a desired position in the road 90 in such a way that at least a part of the main block 10U is exposed. The road stud 10 has a metal or resin housing that prevents rainwater, mud, and other foreign objects from entering it from the outside. The main block 10U includes a control substrate including a terminal control unit 11, a radio communication unit 12, a light emission unit 13, a moving body detection unit 14 and the like.

The terminal control unit 11 receives signals as appropriate from each of the components included in the control substrate or controls each of the components. The terminal control unit 11 includes, for example, an integrated circuit called a Central Processing Unit (CPU) or a Micro Controller Unit (MCU).

The radio communication unit 12 communicates with a group control apparatus 20, which is a control system that controls a plurality of the road studs 10. The radio communication unit 12 includes a transmission/reception control circuit that is implemented in the control substrate and controls communication with the control system (the group control apparatus 20) and an antenna part that transmits and receives signals. The radio communication unit 12 communicates with the group control apparatus 20 using, for example, radio waves in a frequency band of 920 megahertz.

Note that the above frequency band that the radio communication unit 12 uses is only one example thereof and other frequency bands may instead be used.

A first light emission unit 13A and a second light emission unit 13B each include a light emitting diode (LED) and emit a preset light to the surroundings. In this embodiment, the first light emission unit 13A and the second light emission unit 13B may be collectively referred to as a "light emission unit 13".

The light emission units 13 are provided in such a way that they emit light in directions different from one another. In this embodiment, two light emission units 13 are provided in such a way that they emit light in directions opposite to each other. Hereinafter, in this embodiment, the direction in which the first light emission unit 13A emits a light is referred to as a first direction and the direction in which the second light emission unit 13B emits a light is referred to as a second direction.

In the main block 10U, windows that transmit light are provided on the outside of the two light emission units 13. Since the light emission units 13 emit light, nearby pedestrians or drivers of automobiles are able to visually recognize the light emitted from the road studs 10. The two light emission units 13 may include LEDs having the same specification or may include LEDs having specifications different from each other. The two light emission units 13 may be controlled in such a way that the color tone, luminance, timings when they emit light or the like are different from each other.

The moving body detection unit 14, which is a moving body sensor, detects nearby moving bodies using electromagnetic waves such as infrared rays or microwaves. In the moving body detection unit 14, a transmission part for receiving the electromagnetic waves is exposed from the housing of the road stud 10.

The power supply block 10L, which is located below the main block 10U, is embedded in the road 90. The power supply block 10L includes a storage battery 16 and a transformer 17.

The storage battery 16, which is connected to the transformer 17 that will be described later, receives power from the transformer 17. The storage battery 16 converts an alternating current received from the transformer 17 into a direct current as appropriate, receives a predetermined voltage, and stores power. The storage battery 16 supplies the stored power to the control substrate included in the main block 10U. Accordingly, the road stud 10 provides a suitable operation with stable power.

The transformer 17 is provided along with a power line of an AC power embedded near the road stud 10. The transformer 17 includes a coil around the AC power line. Accordingly, the transformer 17 generates an alternating current. The transformer 17 supplies the generated current to the storage battery 16 via an electric wire (power supply line). According to the aforementioned configuration, the road studs 10 are able to suitably store a desired amount of power.

The piping box 81 is installed between the road 90 and the sidewalk 91. The piping box 81 is, for example, a rectangular and hollow piping equipment made of concrete. The hollow part of the piping box 81 contains social infrastructure such as a power transmission line, a distribution line, or an optical cable. The piping box 81 shown in FIG. 1 includes a hollow part that includes a power line 80. In the transformer 17, a magnetic body made of iron, and a coil, surround the power line 80. Accordingly, current is generated in the transformer 17.

The road studs 10 have been described above. FIG. 1 shows a road stud 10 having a configuration in which the main block 10U and the part of the power supply block 10L that stores the storage battery 16 are integrated with each other. Instead, the road stud 10 may have a configuration in which the main block 10U and the power supply block 10L are separated from each other. This configuration allows the road stud 10 to be installed in a more flexible manner.

Next, the group control apparatus 20 will be described. The group control apparatus 20 shown in FIG. 1 is embedded in the multi-purpose pole 82. The multi-purpose pole 82, which is installed in a predetermined position in the road, includes various kinds of equipment such as a base station of a wireless network or a mobile telephone, a surveillance camera, or a lamp.

The group control apparatus 20 communicates with a plurality of road studs 10 and controls each of the road studs 10 which the group control apparatus 20 communicates with. The group control apparatus 20 communicates with, for example, several tens or several hundreds of road studs 10 by radio communication.

Figure 2:
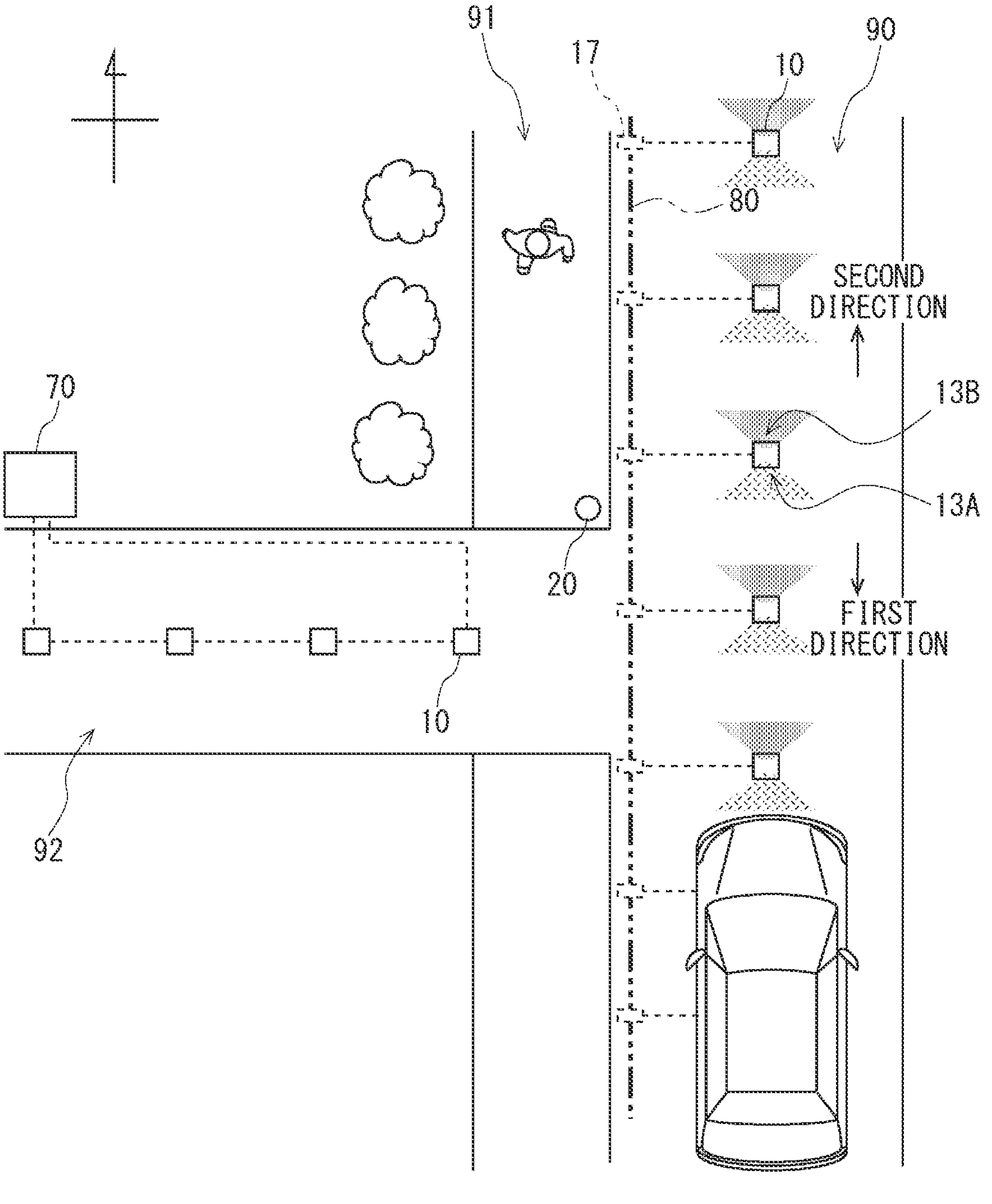
FIG. 2 is a plan view showing a configuration of a road stud system.

With reference next to FIG. 2, the road studs 10 and the group control apparatus 20 will be further described. FIG. 2 is a plan view showing a configuration of a road stud system. FIG. 2 shows streets where the road stud system is installed. In FIG. 2, the upper direction indicates north, the lower direction indicates south, the right direction indicates east, and the left direction indicates west.

In FIG. 2, the road 90 is extended in the north-south direction. Further, the sidewalk 91 is extended in the west of the road 90 in such a way that the sidewalk 91 is parallel to the road 90. The power line 80 is embedded near the boundary between the road 90 and the sidewalk 91 in such a way that the power line 80 is parallel to the road 90. Further, a side road 92 is extended toward west from the middle part of the sidewalk 91.

In the road 90 shown in FIG. 2, the road studs 10 are embedded in the center of the road 90 in such a way that they are installed every few meters at equal intervals. In each of the road studs 10, the transformer 17 is provided along with the power line 80. As described above, the road studs 10 independently secure power, which is a power supply. Accordingly, a road stud 10 where there is a problem such as a failure does not affect the other road studs 10.

In the road studs 10 embedded in the road 90, of the light emission units 13, the first light emission units 13A are provided in such a way that they face in the south direction and the second light emission units 13B are provided in such a way that they face in the north direction. That is, in the road studs 10 embedded in the road 90, the first direction is set in the south direction and the second direction is set in the north direction.

In FIG. 2, the group control apparatus 20 is installed near the place where the road 90 meets the side road 92. The group control apparatus 20 controls the plurality of road studs 10 shown in FIG. 2. That is, the group control apparatus 20 controls the plurality of road studs 10 that communicate with the group control apparatus 20 as a group that it manages.

On the road 90, an automobile is travelling from south to north. In this case, in each of the road studs 10, the moving body detection unit 14 detects this automobile and emits a green light toward the direction of south where the automobile is present, which is the first direction. Further, each of the road studs 10 emits, for example, a red light toward the direction of north, which is the second direction and is a direction opposite to the direction of south where the automobile is present.

Next, another aspect of the road studs 10 will be described. A power supply apparatus 70 is installed in the north of the side road 92. The power supply apparatus 70 is an apparatus for supplying power to the plurality of road studs 10. In the power supply apparatus 70, a power supply line is connected to the plurality of road studs 10 in a chain manner so that the power supply apparatus 70 is able to supply generated power to the plurality of road studs 10. A power line is not embedded in the side road 92. If the road studs 10 are installed in the road of this kind, the road studs 10 are able to receive power supplied from the power supply apparatus 70.

Figure 3:
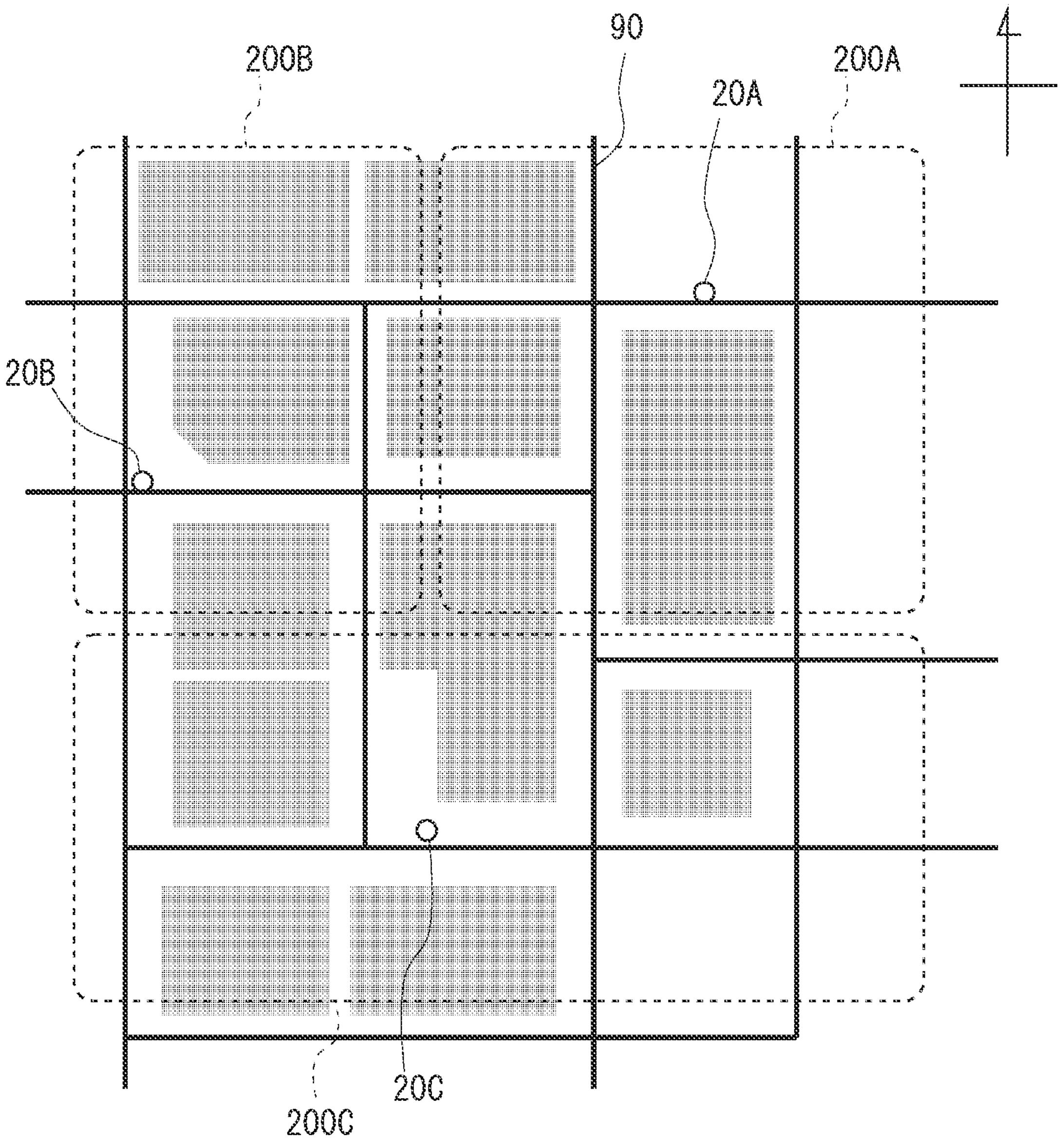
FIG. 3 is a plan view showing a configuration of groups according to the road stud system.

With reference next to FIG. 3, the road stud system will be further described. FIG. 3 is a plan view showing a configuration of groups according to the road stud system. FIG. 3 shows streets in an area wider than that shown in FIG. 2, and shows a predetermined city area. In the plan view shown in FIG. 3, the directions are defined, like in FIG. 2. In FIG. 3, thick straight lines that are extended in the east-west direction or the north-south direction show roads 90. The parts shown in gray surrounded by the roads 90 are buildings or the like.

Three group control apparatuses 20 (20A, 20B, and 20C) are installed in FIG. 3. Each of the group control apparatuses 20 is surrounded by a dotted rectangle. The dotted rectangle shows an area where road studs 10 managed by each group control apparatus 20 are provided. That is, the group control apparatus 20A controls the road studs 10 arranged in an area 200A. The group control apparatus 20B controls the road studs 10 arranged in an area 200B. Then, the group control apparatus 20C controls the road studs 10 arranged in an area 200C.

Figure 4:
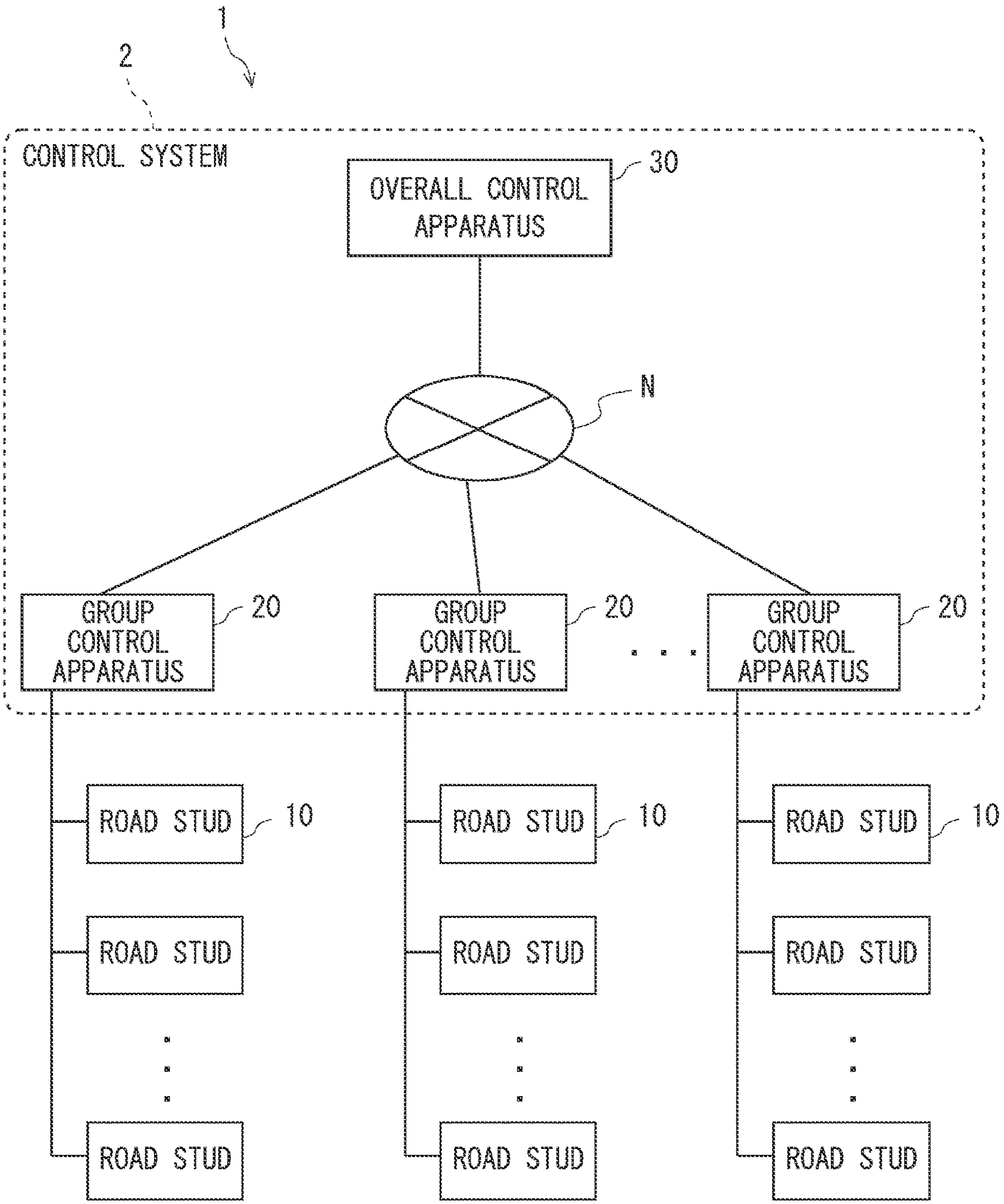
FIG. 4 is a block diagram showing an overview of the road stud system according to the embodiment.

With reference next to FIG. 4, the road stud system will be further described. FIG. 4 is a block diagram showing an overview of the road stud system according to the embodiment. FIG. 4 shows a block diagram of a road stud system 1. The road stud system 1 includes a control system 2 and a plurality of road studs 10 controlled by the control system 2.

The control system 2 includes a plurality of group control apparatuses 20 and an overall control apparatus 30. The plurality of group control apparatuses 20 and the overall control apparatus 30 are connected to each other in such a way that the group control apparatuses 20 and the overall control apparatus 30 are able to communicate with each other via a network N. As described above, each of the group control apparatuses 20 controls a plurality of road studs 10, which correspond to a group thereof, the plurality of road studs 10 being connected to the group control apparatus 20 in such a way that they can perform radio communication. The group control apparatus 20 supplies information received from the road studs 10 to the overall control apparatus 30. Further, the group control apparatus 20 receives an instruction signal for the road studs 10 from the overall control apparatus 30, and supplies the received instruction signal to the road studs 10.

The overall control apparatus 30 is connected to the plurality of group control apparatuses 20 via the network N. The overall control apparatus 30 receives information regarding the road studs 10 from the group control apparatus 20. Further, the overall control apparatus 30 supplies an instruction signal for controlling the road studs 10 to the group control apparatus 20 in accordance with the received information.

Note that the road studs 10, the group control apparatus 20, and the overall control apparatus 30, each including a circuit board in which a flash memory, a Dynamic Random Access Memory (DRAM), and a Central Processing Unit (CPU) are, for example, implemented, execute a control program stored in a memory, thereby implementing the function of the system. Further, the road studs 10, the group control apparatus 20, and the overall control apparatus 30 may be implemented by any combination of hardware, firmware, and software, instead of being implemented by software by the control program stored in the non-volatile memory in advance.

Figure 5:
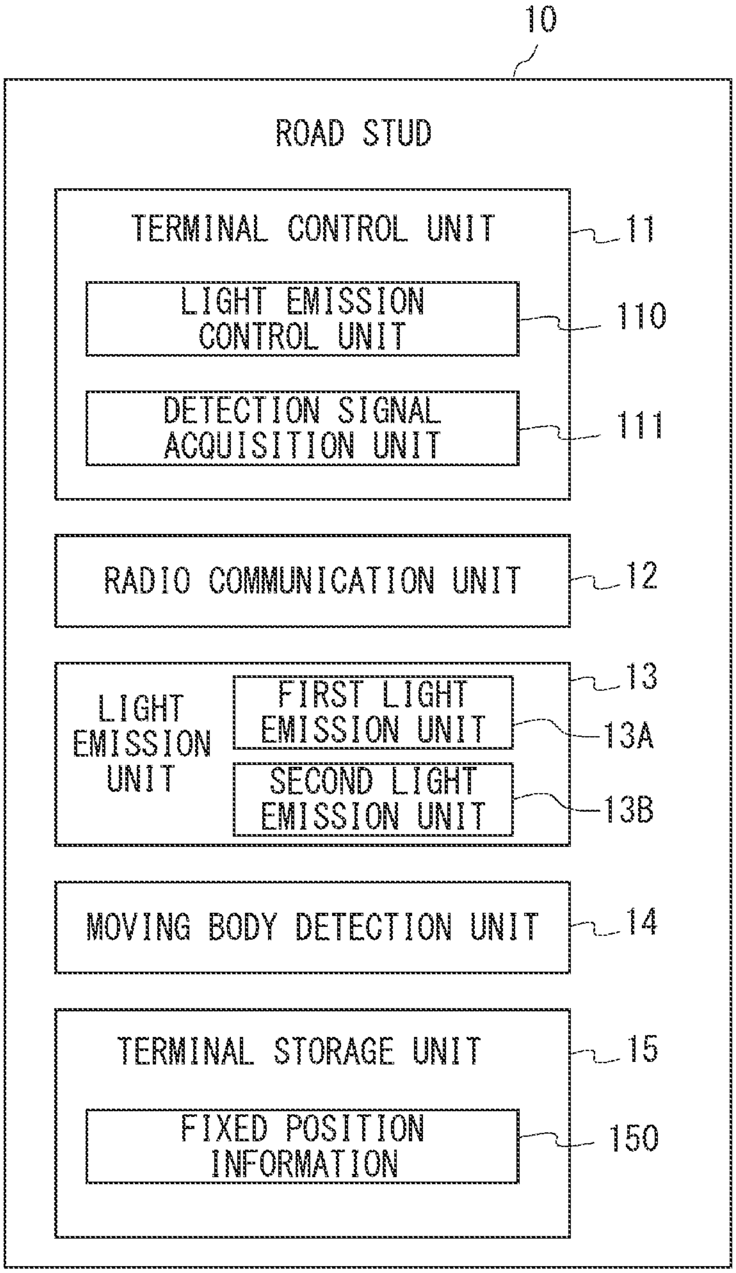
FIG. 5 is a block diagram of the road stud according to the embodiment.

With reference next to FIG. 5, a function of the road stud 10 will be described. FIG. 5 is a block diagram of the road stud according to the embodiment. The road stud 10 includes a terminal control unit 11, a radio communication unit 12, a light emission unit 13, a moving body detection unit 14, and a terminal storage unit 15. The aforementioned components are connected to one another in such a way that they can communicate with one another via a communication bus as appropriate.

The terminal control unit 11 is connected to each component of the road studs 10 and controls the road studs 10. The terminal control unit 11 includes a light emission control unit 110 and a detection signal acquisition unit 111. The light emission control unit 110 receives an instruction signal via the radio communication unit 12 and controls the light emission unit 13 in accordance with the received instruction signal. When, for example, the light emission unit 13 includes a set of LEDs of three colors, that is, R (red), G (green), and B (blue), the light emission control unit 110 instructs the frequency of light emission of each color. The detection signal acquisition unit 111 acquires the detection signal generated by the moving body detection unit 14 and transmits the acquired detection signal to the group control apparatus 20 via the radio communication unit 12.

The radio communication unit 12 performs radio communication with the control system 2 (i.e., the group control apparatus 20). The radio communication unit 12 includes a transmission circuit, a reception circuit, an antenna and the like for achieving radio communication with the group control apparatus 20. The radio communication unit 12 receives an instruction signal for the operation of the light emission unit from the group control apparatus 20. Upon receiving the instruction signal, the radio communication unit 12 supplies the received instruction signal to the terminal control unit 11. Upon receiving the detection signal from the terminal control unit 11, the radio communication unit 12 transmits the received detection signal to the group control apparatus 20.

When the radio communication unit 12 performs the aforementioned radio communication, the radio communication unit 12 uses fixed position information stored in the terminal storage unit 15 as information for causing the control system 2 to identify the radio communication unit 12. That is, when, for example, the radio communication unit 12 transmits a detection signal to the group control apparatus 20, it transmits the fixed position information along with the detection signal. The radio communication unit 12 further receives an instruction signal along with the fixed position information when the radio communication unit 12 receives a predetermined instruction signal from the group control apparatus 20.

The "fixed position information", which is preset position information, is also unique identification information that the control system 2 is able to identify the radio communication unit 12. The position information, which corresponds to information on positions where the road studs 10 are embedded, is fixed information. The fixed position information is determined, for example, by specifying positions where the road studs 10 are embedded in predetermined map information linked to the latitude and the longitude. Accordingly, the road studs 10 are able to receive an instruction of the light emission operation associated with the positions where the road studs are embedded.

The light emission unit 13 emits, in accordance with an instruction from the light emission control unit 110, a light to an area near the road studs 10 according to the color and the frequency in accordance with the instruction. The light emission unit 13 includes the first light emission unit 13A and the second light emission unit 13B. The first light emission unit 13A and the second light emission unit 13B are provided in such a way that they emit light in directions opposite to each other.

Upon detecting a moving body, the moving body detection unit 14 generates a detection signal. The moving body detection unit 14 supplies the generated detection signal to the detection signal acquisition unit 111.

The terminal storage unit 15 includes a non-volatile memory such as a flash memory, an Erasable Programmable Read Only Memory (EPROM) or a Solid State Drive (SSD). The terminal storage unit 15 stores the aforementioned fixed position information 150. The terminal storage unit 15 stores fixed position information 150 in advance before the road studs 10 are embedded. The terminal storage unit 15 may be an overwrite-prohibited storage area. The terminal storage unit 15 may be a register associated with a CPU. In the terminal storage unit 15, the fixed position information 150 may be updated by the control system 2 after the road studs 10 are embedded.

The road studs 10 have been described above. With the above-described configuration, the road studs 10 are able to use the fixed position information as an identifier and receive an instruction that is associated with the position information from the group control apparatus 20.

Figure 6:
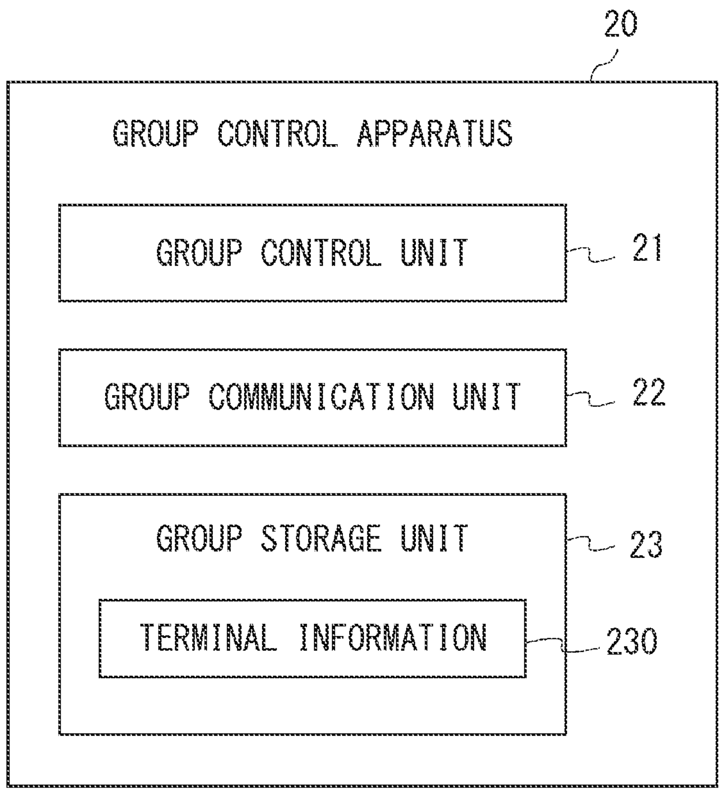
FIG. 6 is a block diagram of a group control apparatus according to the embodiment.

With reference next to FIG. 6, a function of the group control apparatus 20 will be described. FIG. 6 is a block diagram of the group control apparatus according to the embodiment. The group control apparatus 20 includes a group control unit 21, a group communication unit 22, and a group storage unit 23.

The group control unit 21 transmits instruction signals to the plurality of road studs 10 controlled by the group control apparatus 20 as appropriate. Upon receiving an instruction signal from the overall control apparatus 30, the group control unit 21 transmits an instruction signal to the road stud 10 in accordance with the received instruction signal. In order to implement the aforementioned function, the group control unit 21 is connected to the group communication unit 22 and exchanges various kinds of signals. The group control unit 21 further reads terminal information from the group storage unit 23 as necessary. Further, the group control unit 21 updates the terminal information of the group storage unit 23 as necessary.

The group communication unit 22 communicates with each of the plurality of road studs 10. The group communication unit 22 also communicates with the overall control apparatus 30. The group communication unit 22 includes a transmission circuit, a reception circuit, an interface and the like for achieving communication with the road studs 10 and the overall control apparatus 30. Note that the communication method in the case in which the group communication unit 22 communicates with the road studs 10 may be the same as or different from the communication method in the case in which the group communication unit 22 communicates with the overall control apparatus 30.

The group storage unit 23 includes a non-volatile memory such as a flash memory. The group storage unit 23 stores terminal information 230. The terminal information 230 includes at least fixed position information 150 of road studs 10 controlled by the group control apparatus 20. Further, the terminal information 230 may include information regarding the operation state of the light emission unit 13 in each of the road studs 10 or information indicating whether the moving body detection unit 14 is transmitting a detection signal. When the terminal information 230 includes the information regarding the operation state of the light emission unit 13 or the state of the detection signal, the group control unit 21 updates the terminal information 230 as appropriate. According to the aforementioned configuration, the group control apparatus 20 is able to collectively control a plurality of road studs connected to the group control apparatus 20.

Figure 7:
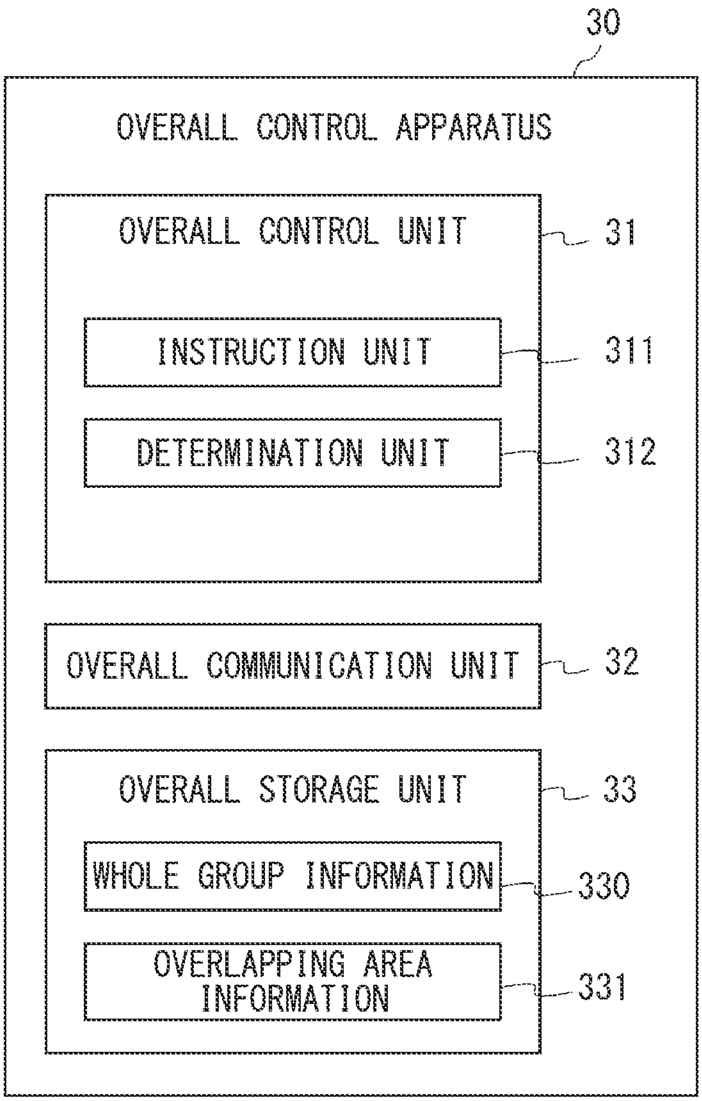
FIG. 7 is a block diagram of an overall control apparatus according to the embodiment.

With reference next to FIG. 7, a function of the overall control apparatus 30 will be described. FIG. 7 is a block diagram of the overall control apparatus according to the embodiment. The overall control apparatus 30 is, for example, a computer. The overall control apparatus 30 includes an overall control unit 31, an overall communication unit 32, and an overall storage unit 33.

The overall control unit 31, which includes an arithmetic circuit such as a CPU, controls the entire road stud system 1. More specifically, the overall control unit 31 controls a plurality of road studs 10 connected thereto via the group control apparatus 20. The overall control unit 31 includes an instruction unit 311 and a determination unit 312.

The determination unit 312 determines whether the overlapping area is in a first state in which passage of pedestrians is prioritized or a second state in which passage of automobiles is prioritized.

The "overlapping area" is an area where the sidewalk and the roadway overlap each other. The overlapping area is an area where pedestrians pass and is also an area where automobiles pass. In the overlapping area, it is possible that a pedestrian and an automobile may contact each other. In order to avoid this contact, the road stud system 1 includes a function of showing the first state in which passage of pedestrians is prioritized and the second state in which passage of automobiles is prioritized for nearby pedestrians and automobiles using road studs 10 installed in outer edges of the overlapping area. Note that the control system 2 instructs road studs 10 embedded in the positions along the overlapping area to perform a light emission operation based on the fixed position information. Accordingly, the road stud system is able to easily control a plurality of road studs.

The determination unit 312 is able to determine whether the overlapping area is in the first state or the second state using various parameters. The determination unit 312 may determine whether the overlapping area is in the first state or the second state depending on, for example, time. Further, the determination unit 312 may determine whether the overlapping area is in the first state or the second state depending on situations of nearby moving bodies. The determination unit 312 is able to determine the situations of the nearby moving bodies from the fixed position information of the light emission control unit 110 and the detection signal. Therefore, the determination unit 312 is able to determine, for example, to emit a light for alerting pedestrians if it is possible that an automobile may enter the overlapping area in a case in which it is determined that the overlapping area is in the first state in which passage of pedestrians is prioritized.

The instruction unit 311 transmits, in accordance with the result of the determination made by the determination unit 312, an instruction signal regarding the direction of the light emission and the color tone to each of the road studs 10. The instruction unit 311 supplies this instruction signal to the group control apparatus 20 via the overall communication unit 32. The group control apparatus 20 transmits an instruction signal to the road studs 10 to which the instruction is applied.

When, for example, the result of the determination made by the determination unit 312 shows that the overlapping area is in the first state, the instruction unit 311 instructs that a light having a color tone for allowing passage be emitted in the direction of pedestrians. Further, when the result of the determination made by the determination unit 312 shows that the overlapping area is in the first state, the instruction unit 311 instructs that a light having a color tone for not allowing passage be emitted in the direction of automobiles. Further, when the result of the determination made by the determination unit 312 shows that the overlapping area is in the second state, the instruction unit 311 instructs that a light having a color tone for not allowing passage be emitted in the direction of pedestrians. Further, when the result of the determination made by the determination unit 312 shows that the overlapping area is in the second state, the instruction unit 311 instructs that a light having a color tone for allowing passage be emitted in the direction of automobiles.

If, for example, an automobile has entered the overlapping area despite the state in which the passage of pedestrians should be prioritized, the determination unit 312 determines that a light for alerting pedestrians be emitted. In this case, the instruction unit 311 instructs that a light having a color tone for alerting pedestrians be emitted in the direction of pedestrians.

As described above, the overall control unit 31 is able to suitably determine whether the result of the determination is in the first state or the second state and perform a light emission operation in accordance with each of the states.

The overall communication unit 32 communicates with the group control apparatus 20 via a network N. The overall storage unit 33 includes a transmission circuit, a reception circuit, an interface and the like for implementing communication with the group control apparatus 20. The overall communication unit 32 supplies a detection signal received from the group control apparatus 20 to the overall control unit 31. Further, the overall communication unit 32 transmits the instruction signal received from the overall control unit 31 to the group control apparatus 20.

The overall storage unit 33 includes a non-volatile memory such as a flash memory. The overall storage unit 33 stores whole group information 330. The whole group information 330 includes fixed position information on each of the road studs 10 included in the terminal information 230 managed by each group control apparatus 20, the operation state of the light emission unit 13 of each of the road studs 10, and the state of the detection signal of the moving body detection unit 14. The overall control apparatus 30 stores the whole group information 330 in the overall storage unit 33 and updates the whole group information 330 as appropriate. Accordingly, the overall control apparatus 30 manages the respective states of the road studs 10. That is, the overall control apparatus 30 is able to collectively control a plurality of road studs that all the groups include.

The overall storage unit 33 further stores overlapping area information 331. The overlapping area information is information indicating an overlapping area in an area where the road studs 10 are embedded. The overlapping area information 331 is information that corresponds to the position information. Therefore, the determination unit 312 of the overall control unit 31 is able to execute processing in the overlapping area from the fixed position information of the road studs 10 included in the whole group information 330 and the overlapping area information 331.

With reference next to FIG. 8, the whole group information will be described. FIG. 8 is a diagram showing the whole group information stored in the overall control apparatus. The table shown in FIG. 8 shows an example of the whole group information 330. The whole group information 330 includes the fixed position information, states of the light emission units, the state of the detection signal, and group attribute information.

The fixed position information is positional information that each of the road studs 10 includes. For example, the first row of the table shows "E137.16021, N35.05075", which is also the fixed position information 150.

On the right side of the fixed position information 150, as the states of the two light emission units 13 that the road stud 10 includes, "the state of the first light emission unit" is indicated as "0:1:0" and "the state of the second light emission unit" is indicated as "1:0:0". They indicate the operation states of RGB of the light emission units 13, "0" indicating off and "1" indicating on. That is, the road stud 10 in the first row is in a state in which the first light emission unit is lit green and the second light emission unit is lit red. Likewise, for example, the road stud 10 in the third row has a state in which the light emission units 13 are not lit. Further, the road stud 10 in the fourth row is in a state in which the first light emission unit is lit blue and the second light emission unit is not lit.

In the whole group information 330, states of detection signals are indicated by "HI" or "LO". "HI" indicates a state in which the moving body detection unit detects a moving body and "LO" indicates a state in which the moving body detection unit does not detect a moving body. In the road stud 10 in the first row, the state of the detection signal is "LO". That is, the road stud 10 in the first row has a state in which the moving body is not detected. Further, the road studs 10 in the second and third rows have a state in which the moving body is detected.

On the right side of the state of the detection signal, the group attribute information is shown. The group attribute information indicates which group the road stud 10 according to the fixed position information 150 indicated in one row belongs to. The group attribute information indicates, for example, that the road studs 10 from the first to third rows are controlled by the group control apparatus 20A. Further, the road studs 10 in the fourth and fifth rows are controlled by the group control apparatus 20B.

The whole group information 330 has been described above. Of the whole group information 330, an information group including the same group attribute information is the same as the terminal information 230 of this group. That is, the whole group information 330 is also a set of the pieces of the terminal information 230 that the respective group control apparatuses 20 include. Further, the terminal information 230 includes the fixed position information 150 of each of the road studs 10 that the group control apparatus 20 includes.

Of the whole group information, the state of the light emission unit 13 and the state of the detection signal may constantly change. These information items are updated, for example, every second. Therefore, the whole group information 330 may store, for example, the history for a preset period. The overall control unit 31 may estimate the presence of a moving body from the history for the preset period.

Figure 9:
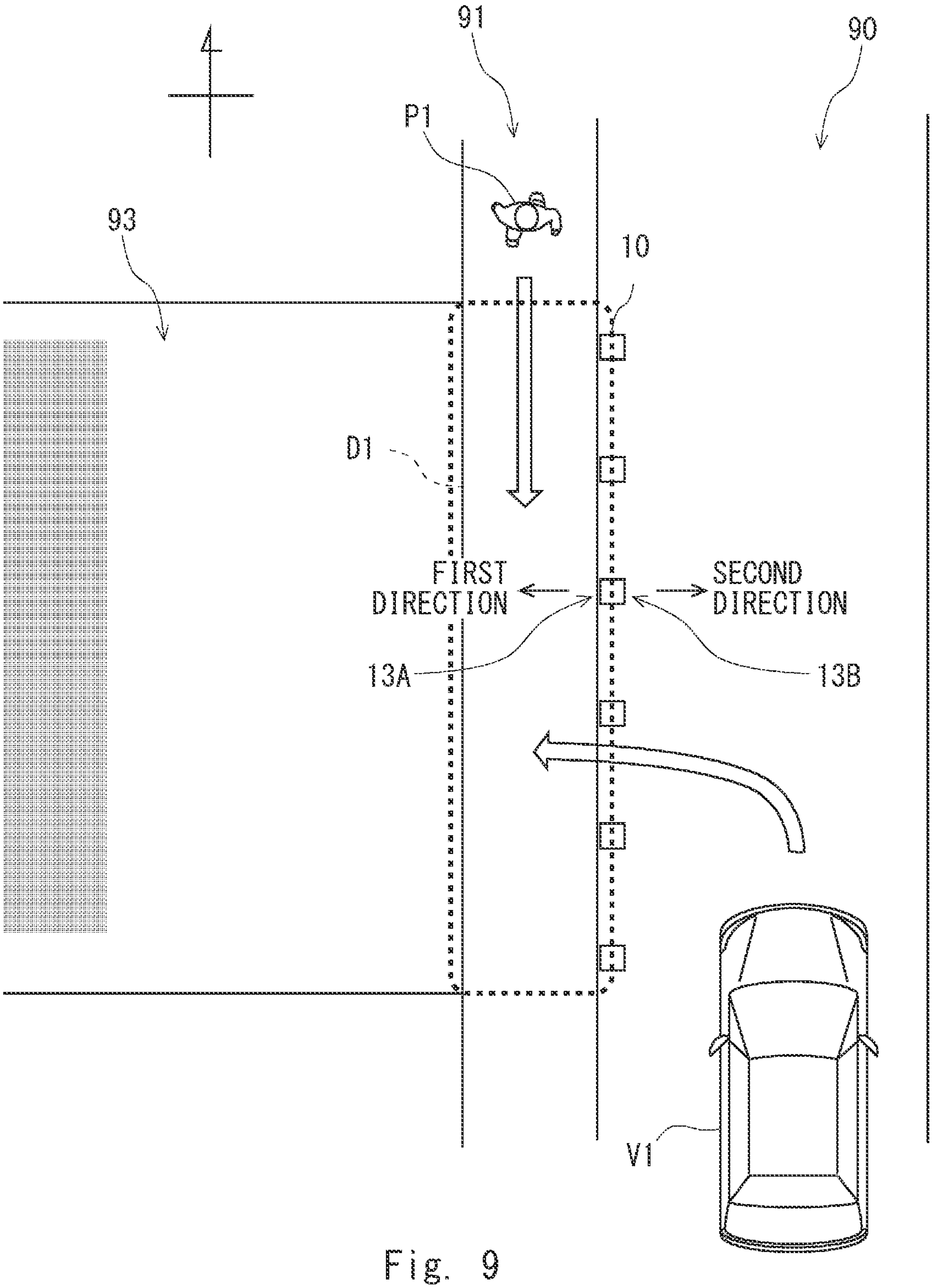
FIG. 9 is a first diagram showing an example of an operation of the road stud system according to the embodiment.

Referring next to FIG. 9, an example of an operation of the road stud system 1 in the overlapping area will be described. FIG. 9 is a first diagram showing an example of the operation of the road stud system according to the embodiment. FIG. 9 shows a road 90 that is extended in the north-south direction, a sidewalk 91 that is extended in the west of the road 90 in such a way that the sidewalk 91 is parallel to the road 90, and a facility 93 that includes an entrance/exit in the middle of the sidewalk 91.

Further, an overlapping area D1 is shown between the facility 93 and the road 90. The overlapping area D1 is an area where the sidewalk and the roadway overlap each other. The facility 93 is a facility where vehicles are allowed to enter. Therefore, as shown in FIG. 9, an automobile V1 which enters the facility 93 crosses the overlapping area D1. Meanwhile, as shown in FIG. 9, a pedestrian P1 also walks through the overlapping area D1 along the sidewalk 91. The overlapping area D1 is an area where the pedestrian P1 passes and is also an area where the automobile V1 passes.

In the street in the above situation, in the boundary between the road 90 and the sidewalk 91 in the positions along the outer edges of the overlapping area D1, a plurality of road studs 10 are embedded. In the example shown in FIG. 9, the road stud system 1 determines whether the overlapping area D1 is in a first state in which pedestrians are prioritized or a second state in which automobiles are prioritized and causes a light emission unit 13 to operate in accordance with the result of the determination.

In the example shown in FIG. 9, the road studs 10 are set in such a way that the first light emission unit 13A emits a light in the first direction shown in FIG. 9. Further, the road studs 10 are set in such a way that the second light emission unit 13B emits a light in the second direction in FIG. 9.

The first direction is a direction from the road studs 10 to the sidewalk 91. That is, by emitting a light in the first direction, the road studs 10 are able to cause the pedestrian P1 to recognize the light. The second direction is a direction from the road studs 10 to the road 90. That is, by emitting a light in the second direction, the road studs 10 are able to cause the automobile V1 to recognize the light. With the above-described configuration, the road stud system is able to emit a light to pedestrians and automobiles.

Figure 10:
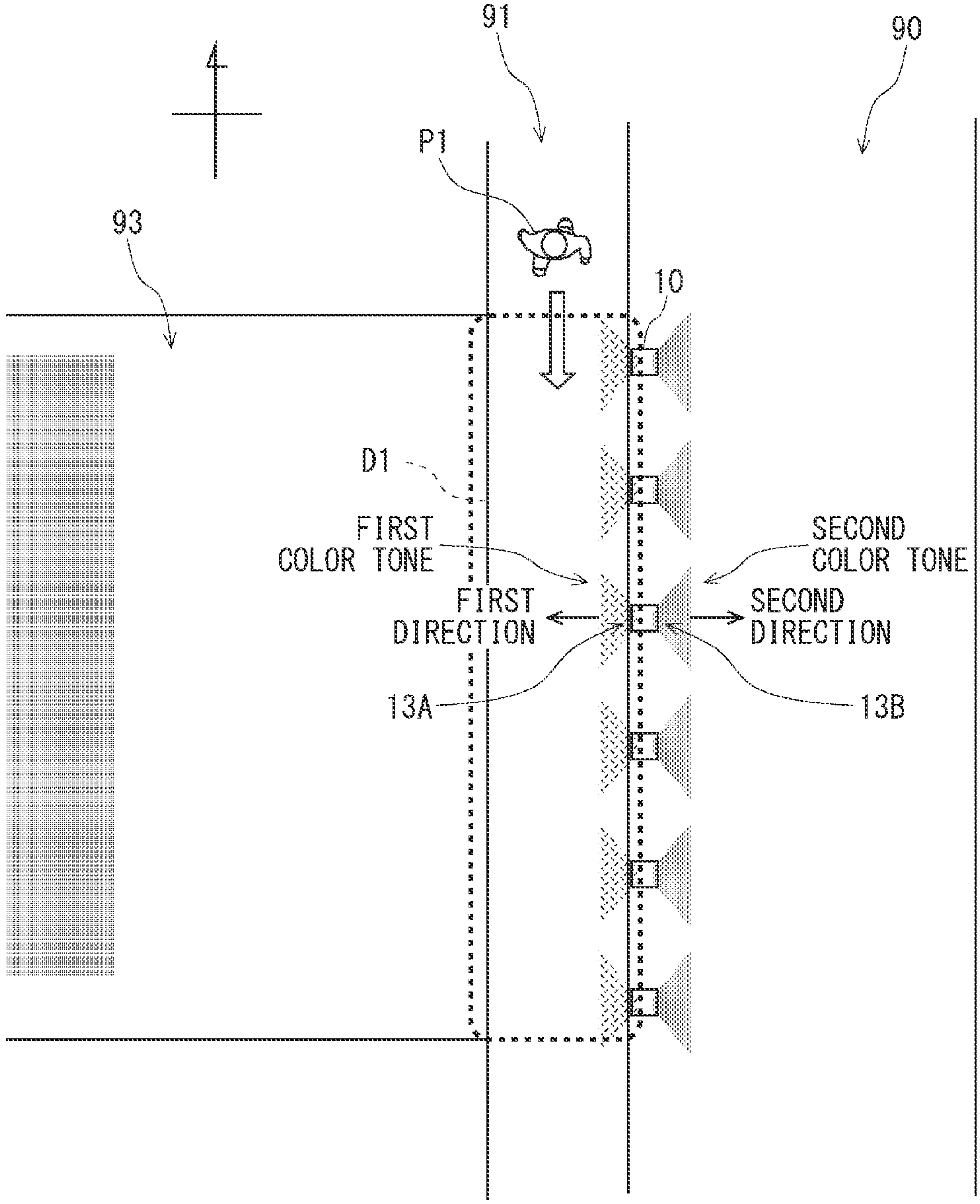
FIG. 10 is a second diagram showing an example of the operation of the road stud system according to the embodiment.

Referring next to FIG. 10, an operation of the road stud system 1 in the first state will be described. FIG. 10 is a second diagram showing an example of the operation of the road stud system according to the embodiment. The street shown in FIG. 10 is the same as that shown FIG. 9. In the street shown in FIG. 10, the pedestrian P1 is walking on the sidewalk 91.

A moving body detection unit 14 of a road stud 10 embedded near the pedestrian P1 detects the pedestrian P1 as a moving body and transmits a detection signal to the control system 2. The determination unit 312 determines, from the received detection signal and fixed position information of the road stud 10 that has transmitted the detection signal, that a moving body is present. More specifically, the determination unit 312 determines the presence of the moving body from the history for a preset period among information items received from the road stud 10. The determination unit 312 that has determined the presence of the pedestrian P1 then determines that the overlapping area D1 is in the first state. Then, the determination unit 312 supplies a signal indicating that the overlapping area D1 is in the first state to the instruction unit 311.

Upon receiving, from the determination unit 312, a signal indicating that the result of the determination indicates that the overlapping area is in the first state, the instruction unit 311 generates an instruction signal in accordance with the result of the determination. The instruction signal in the first state includes an instruction for emitting a light having a first color tone to the first light emission units 13A that are facing in the first direction and an instruction for emitting a light having a second color tone to the second light emission units 13B that are facing in the second direction.

Figure 11:
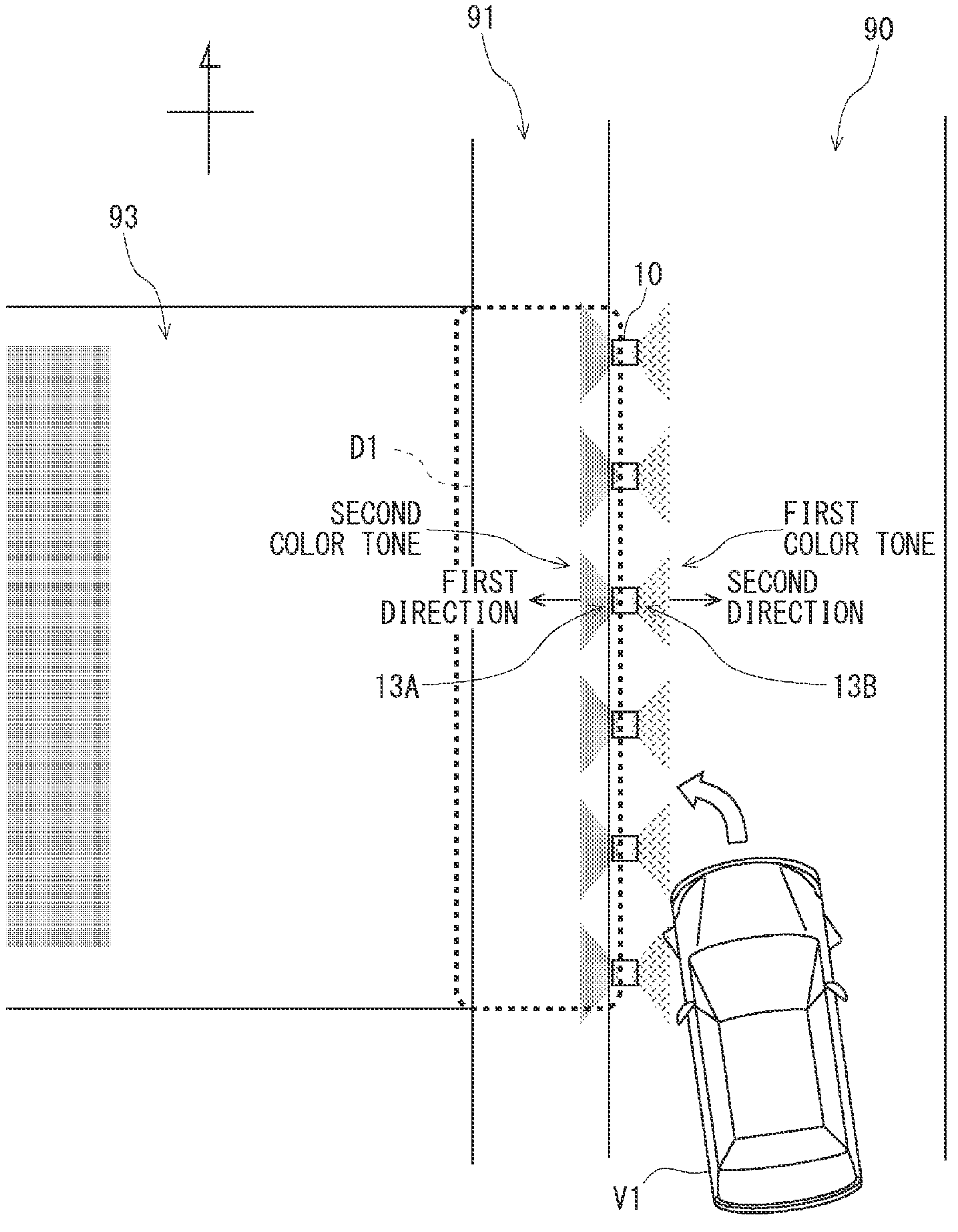
FIG. 11 is a third diagram showing an example of the operation of the road stud system according to the embodiment.

Referring next to FIG. 11, an operation of the road stud system 1 in the second state will be described. FIG. 11 is a third diagram showing an example of the operation of the road stud system according to the embodiment. The street shown in FIG. 11 is the same as that shown in FIG. 9. In the street shown in FIG. 11, the automobile V1 travels on the road 90 and is about to enter the overlapping area D1. Further, the pedestrian P1 is not present on the sidewalk 91.

The moving body detection unit 14 of the road stud 10 embedded near the automobile V1 detects the automobile V1 as a moving body and transmits a detection signal to the control system 2. The determination unit 312 determines, from the received detection signal and the fixed position information of the road stud 10 that has transmitted the detection signal, that an automobile V1, which is a moving body, is present. More specifically, the determination unit 312 determines the presence of the automobile V1 from the history for a preset period among the information items received from the road stud 10. Upon determining that the automobile V1 is present, the determination unit 312 determines that the overlapping area D1 is in the second state. Then the determination unit 312 supplies a signal indicating that the overlapping area D1 is in the second state to the instruction unit 311.

Upon receiving the signal indicating that the result of the determination indicates that the overlapping area is in the second state from the determination unit 312, the instruction unit 311 generates an instruction signal in accordance with the result of the determination. The instruction signal which is in the second state includes an instruction for emitting a light having a second color tone to the first light emission units 13A that are facing in the first direction and an instruction for emitting a light having a first color tone to the second light emission units 13B that are facing in the second direction.

Figure 12:
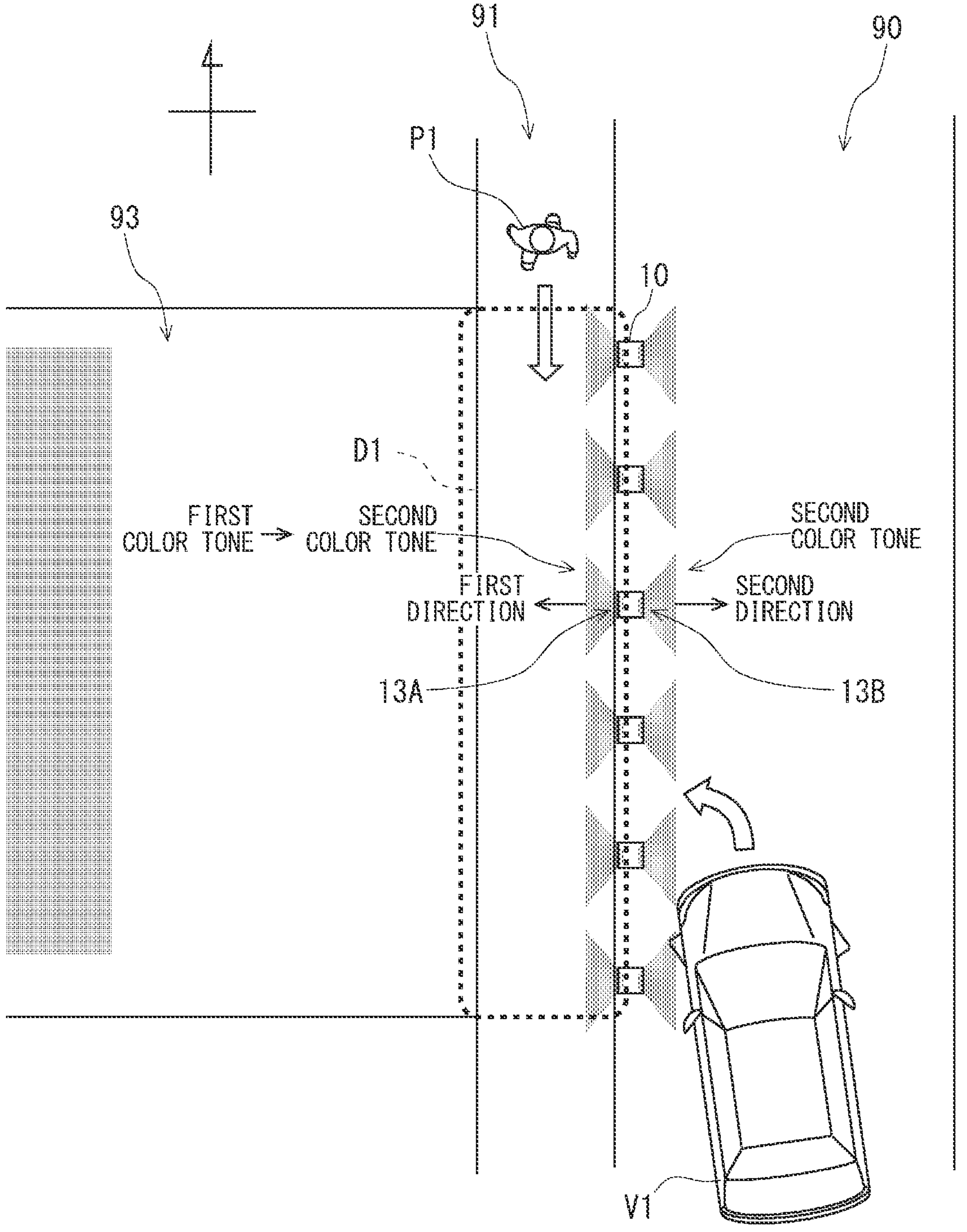
FIG. 12 is a fourth diagram showing an example of the operation of the road stud system according to the embodiment.

Referring next to FIG. 12, an operation of the road stud system 1 in a case in which the automobile V1 enters the overlapping area D1 in the first state will be described. FIG. 12 is a fourth diagram showing an example of the operation of the road stud system according to the embodiment. The street shown in FIG. 12 is the same as that shown in FIG. 9.

In the street shown in FIG. 12, the pedestrian P1 who walks on the sidewalk 91 is about to enter the overlapping area D1, and at the same time, the automobile V1 that travels on the road 90 is about to enter the overlapping area D1.

In the example shown in FIG. 12, the determination unit 312 of the road stud system 1 determines that the overlapping area is in the first state, just like in FIG. 10. Therefore, the instruction unit 311 sends an instruction signal to instruct the first light emission units 13A to emit a light having a first color tone and instruct the second light emission units 13B to emit a light having a second color tone. However, after that, the determination unit 312 determines that the automobile V1 is about to enter the overlapping area D1. In this case, the instruction unit 311 transmits, to the first light emission units 13A, an instruction signal for changing from emission of the light having the first color tone to emission of the light having the second color tone.

As described above, even if it is determined that the overlapping area is in the first state, the road stud system 1 is able to change the operation of the light emission units 13 of the road studs 10 in a flexible manner in accordance with situations of a nearby moving body. In the above road stud system 1, the determination unit 312 may set the result of the determination as the first state when a pedestrian P1 is detected on a sidewalk which is in or near the overlapping area D1 or when an automobile is not detected on a roadway which is in or near the overlapping area D1. In this case, the determination unit 312 may set the result of the determination as the second state when the result of the determination indicates that the overlapping area is not in the first state. Accordingly, the road stud system is able to reduce the possibility that a pedestrian and an automobile may contact each other in the overlapping area.

The embodiment has been described above. According to the embodiment, it is possible to provide a road stud system having suitable visibility.

The present disclosure is not limited to the aforementioned embodiment and may be changed as appropriate without departing from the spirit of the present disclosure.

The aforementioned program includes instructions (or software codes) that, when loaded into a computer, cause the computer to perform one or more of the functions described in the embodiment. The program may be stored in a non-transitory computer readable medium or a tangible storage medium. By way of example, and not a limitation, computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (registered trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A road stud system comprising a control system for controlling a plurality of road studs embedded in or on outer edges of an overlapping area where a sidewalk and a roadway overlap each other and the plurality of road studs controlled by the control system, wherein each of the road studs comprises:

a terminal storage unit configured to store preset identification information;

a light emission unit configured to emit a light having a first color tone or a second color tone that is different from the first color tone in a preset first direction or a second direction that is different from the first direction; and a radio communication unit configured to receive an instruction signal for an operation of the light emission unit from the preset control system based on the identification information, and the control system comprises:

a determination unit configured to determine whether the overlapping area is in a first state in which passage of a pedestrian is prioritized or a second state in which passage of an automobile is prioritized; and an instruction unit for sending an instruction signal, in accordance with the result of the determination, regarding the direction of the light emission and the color tone to each of the road studs, wherein each of the road studs further comprises a moving body detection unit configured to generate a detection signal indicating that a nearby moving body has been detected and the radio communication unit transmits the detection signal to the control system, the determination unit further determines whether or not it is possible that a moving body may enter the overlapping area based on the detection signal, and when the result of the determination shows that the overlapping area is in the first state, the instruction unit instructs that a light having the second color tone be emitted in the first direction in a case in which it is possible that an automobile may enter the overlapping area.

2. The road stud system according to claim 1, wherein when the result of the determination shows that the overlapping area is in the first state, the instruction unit instructs that a light having the first color tone be emitted in the first direction and instructs that a light having the second color tone be emitted in the second direction, and when the result of the determination shows that the overlapping area is in the second state, the instruction unit instructs that a light having the second color tone be emitted in the first direction and instructs that a light having the first color tone be emitted in the second direction.

3. The road stud system according to claim 1, wherein the determination unit sets the result of the determination as the first state when a pedestrian is detected in a sidewalk which is in or near the overlapping area or when an automobile is not detected in a roadway which is in or near the overlapping area, and the determination unit sets the result of the determination as the second state when the result of the determination shows that the overlapping area is not in the first state.

4. The road stud system according to claim 1, wherein the control system further comprises:

a group control apparatus including a group control unit that is connected to each of the plurality of road studs in such a way that the group control apparatus and each of the plurality of road studs can perform radio communication, the group control unit controlling the plurality of road studs based on the identification information; and an overall control apparatus that is connected to a plurality of the group control apparatuses in such a way that the overall control apparatus and the plurality of the group control apparatuses can communicate with each other and controls the plurality of road studs based on the identification information via the group control apparatus.

5. The road stud system according to claim 1, wherein the terminal storage unit stores unique fixed position information as the identification information.

6. The road stud system according to claim 5, wherein the control system instructs the road studs embedded in positions along the outer edges of the overlapping area in the first state or the second state to perform a light emission operation based on the fixed position information.

7. A method for controlling a road stud executed by a control system for controlling a plurality of road studs embedded in or on outer edges of an overlapping area where a sidewalk and a roadway overlap each other and the plurality of road studs controlled by the control system, wherein each of the road studs comprises:

a terminal storage step of storing preset identification information;

a light emission step of emitting a light having a first color tone or a second color tone which is different from the first color tone in a preset first direction or a second direction that is different from the first direction; and a radio communication step of receiving, based on the identification information, an instruction signal for an operation of the light emission step from the preset control system, and the control system comprises:

a determination step of determining whether the overlapping area is in a first state in which passage of a pedestrian is prioritized or a second state in which passage of an automobile is prioritized; and an instruction step of sending an instruction signal, in accordance with the result of the determination, regarding the direction of the light emission and the color tone to each of the road studs, wherein each of the road studs further comprises a moving body detection step of generating a detection signal indicating that a nearby moving body has been detected and the radio communication step transmits the detection signal to the control system, the determination step further determines whether or not it is possible that a moving body may enter the overlapping area based on the detection signal, and when the result of the determination shows that the overlapping area is in the first state, the instruction step instructs that a light having the second color tone be emitted in the first direction in a case in which it is possible that an automobile may enter the overlapping area.

8. A non-transitory computer readable medium storing a program for causing a computer to execute a method for controlling road studs, the program being a control program of road studs and executed by a control system for controlling a plurality of road studs embedded in or on outer edges of an overlapping area where a sidewalk and a roadway overlap each other and the plurality of road studs controlled by the control system, wherein each of the road studs comprises:

a terminal storage step of storing preset identification information;

a light emission step of emitting a light having a first color tone or a second color tone which is different from the first color tone in a preset first direction or a second direction that is different from the first direction; and a radio communication step of receiving, based on the identification information, an instruction signal for an operation of the light emission step from the preset control system, and the control system comprises:

a determination step of determining whether the overlapping area is in a first state in which passage of a pedestrian is prioritized or a second state in which passage of an automobile is prioritized; and an instruction step of sending an instruction signal, in accordance with the result of the determination, regarding the direction of the light emission and the color tone to each of the road studs, wherein each of the road studs further comprises a moving body detection step of generating a detection signal indicating that a nearby moving body has been detected and the radio communication step transmits the detection signal to the control system, the determination step further determines whether or not it is possible that a moving body may enter the overlapping area based on the detection signal, and when the result of the determination shows that the overlapping area is in the first state, the instruction step instructs that a light having the second color tone be emitted in the first direction in a case in which it is possible that an automobile may enter the overlapping area.

* * * * *